United States Patent [19]
Uto et al.

[11] Patent Number: 5,611,745
[45] Date of Patent: Mar. 18, 1997

[54] TOOTHED POWER TRANSMISSION BELT

[75] Inventors: Kuniharu Uto, Suma-ku; Yoshihisa Fujita, Nishi-ku; Takahide Mizuno, Hyogo-ku, all of Japan

[73] Assignee: Mitsuboshi Belting Ltd., Kobe, Japan

[21] Appl. No.: 506,220

[22] Filed: Jul. 24, 1995

[30] Foreign Application Priority Data

Jul. 26, 1994 [JP] Japan ................................. 6-194831

[51] Int. Cl.$^6$ ..................................................... F16G 1/04
[52] U.S. Cl. ......................... 474/205; 474/267; 474/268
[58] Field of Search ...................................... 474/205, 250, 474/260, 263, 267, 268

[56] References Cited

U.S. PATENT DOCUMENTS

| | | | |
|---|---|---|---|
| 3,858,948 | 1/1975 | Johnson et al. | 305/38 X |
| 4,083,260 | 4/1978 | Carlson et al. | 74/233 |
| 4,652,252 | 3/1978 | Westhoff et al. | 474/204 |
| 4,681,558 | 7/1987 | Rausch | 474/205 |
| 4,790,802 | 12/1988 | Onoe et al. | 474/260 |
| 4,822,324 | 4/1989 | Georget | 474/268 |
| 4,838,843 | 6/1989 | Westhoff | 474/205 |
| 5,120,280 | 6/1992 | Mizuno et al. | 474/260 |
| 5,160,301 | 11/1992 | Nakanishi et al. | 474/263 |
| 5,242,743 | 9/1993 | Nakanishi et al. | 474/205 X |
| 5,335,456 | 8/1994 | Mishima | 51/281 R |
| 5,378,206 | 1/1995 | Mizuno et al. | 474/205 X |
| 5,417,618 | 5/1995 | Osako et al. | 474/205 |

FOREIGN PATENT DOCUMENTS 0440425  8/1991  European Pat. Off. .
4413540  10/1994  Germany .

OTHER PUBLICATIONS

Oct. 1979, Japanese Patent Abstract No. 54-135954.

*Primary Examiner*—Roger J. Schoeppel
*Attorney, Agent, or Firm*—Wood, Phillips, VanSanten, Clark & Mortimer

[57] ABSTRACT

A power transmission belt having a body with an inside and an outside, a length, and a plurality of teeth on one of the inside and outside of the belt body and spaced in a likewise direction. A load carrying cord is embedded in the belt body and extends lengthwise thereof. The load carrying cord is made up of a first plurality of monofilament aramid fibers, each having a denier of 0.5 to 2.0 and bundled to define a combined diameter of 0.10 to 0.20 mm.

22 Claims, 1 Drawing Sheet

TOOTHED POWER TRANSMISSION BELT

BACKGROUND OF THE INVENTION

1. Field of the Invention

This invention relates to power transmission belts and, more particularly, to a power transmission belt having regularly spaced driving teeth thereon, that is particularly adaptable to be used in an environment requiring that the belt remain flexible at low temperatures with the system under a small load.

2. Background Art

Toothed power transmission belts are used in a number of different environments. As examples, it is common to use a toothed belt for a printer carriage belt, a bill transportation belt, a card transportation belt, etc.

It is known to make the load carrying cords in this type of belt from aramid fibers. Aramid fibers have high strength and a high modulus which gives excellent dimensional stability in a heated environment as compared to cords made from other types of organic fibers.

In Japanese Patent Laid-Open 135954/1979, an aramid fiber load carrying cord is shown with a twist coefficient of 1.4–2.6 and a diameter of 300–500 denier.

It is also known to construct a load carrying cord by bundling and twisting a plurality of raw aramid fibers and applying an adhesive treatment thereto. This increases the cord's resistance to flexing fatigue and reduces the tendency of the cord to fray.

While a toothed belt using load carrying cords made from aramid fiber, as discussed above, is desirable for the reasons stated, these belts may lack the requisite flexibility in environments in which there is a small shaft load, as on small motors used with a printer carriage belt, a bill transportation belt, a card transportation belt, or the like. At low temperatures, this type of belt typically becomes highly rigid, which may require a high starting torque and cause exertion of a large load on pulley shafts about which the belt is trained. The result of exerting this large load on the shaft may be excessive heat generation, abnormal sound development, and/or localized abrasion in the contact areas of the belt. To overcome these problems, shortcomings, the entire system, including the belt, may have to be made larger than desirable. Further, due to the high required starting torque, the capacity of the motor may have to be increased over that which is desired, which adds to the cost of manufacture and operation of the overall system.

SUMMARY OF THE INVENTION

In one form of the invention, a power transmission belt is provided having a body with an inside and an outside, a length, and a plurality of teeth on one of the inside and outside of the belt body and spaced in a likewise direction. A load carrying cord is embedded in the belt body and extends lengthwise thereof. The load carrying cord is made up of a first plurality of monofilament aramid fibers, each having a denier of 0.5 to 2.0 and bundled to define a combined diameter of 0.10 to 0.20 mm.

A toothed power transmission belt can be made, according to the invention, so that the belt is flexible at low temperatures, can operate effectively with a small shaft load (i.e. under low tension), and is operable with a relatively low starting torque.

In one form, at least some of the monofilament aramid fibers are twisted together. The monofilaments may be grouped to define strands which are twisted together. The fibers may be single twisted up to 100 times per 10 cm.

At least some of the first plurality of monofilament aramid fibers may be bonded together without twisting, as by using a treating solution that may be one of a) an RFL solution, b) an epoxy compound, and c) an isocyanate compound.

After the monofilament aramid fibers are bonded together, they may be treated with one of a) an RFL treatment and b) robber cement.

In one form, at least some of the aramid fibers have aromatic nuclei in the main skeleton of the molecular structure.

Among the suitable aramid fibers are those sold commercially under at least one of the trademarks "CONEX"™, "NOMEX"™, "KEVLAR"™, "TECHNORA"™ and "TWARON"™.

In one form, a cloth layer covers the teeth. The cloth layer may be at least one of 6-nylon, 6,6-nylon, polyester, and aramid fiber.

The cloth layer may be made up of warp and weft yarns that are at least one of filament yarns and spun yarns.

In one form, the weft yarns are at least one of woolly nylon yarns, elastic urethane yarns, and a mixture of elastic urethane yarns and nylon yarns.

The cloth layer may at least one of a plain weave, twill weave, and satin weave fabric.

The cloth layer may be treated, as with a resorcin-formalin-latex solution.

In another form of the invention, a power transmission belt is provided having a body with an inside, an outside, a length, laterally spaced sides, and a plurality of teeth on the inside of the body and spaced in a lengthwise direction. A plurality of laterally spaced, load carrying cords are embedded in the belt body and extend lengthwise thereof. A cloth layer is provided on the inside of the belt body and covers the teeth. There is a coating on the cloth layer. The load carrying cords each are defined by a first plurality of monofilament fibers each having a denier of 0.5 to 2.0 bundled so that the load carrying cords have a combined diameter of 0.10 to 0.20 mm.

DETAILED DESCRIPTION OF THE DRAWINGS

Figure 1:
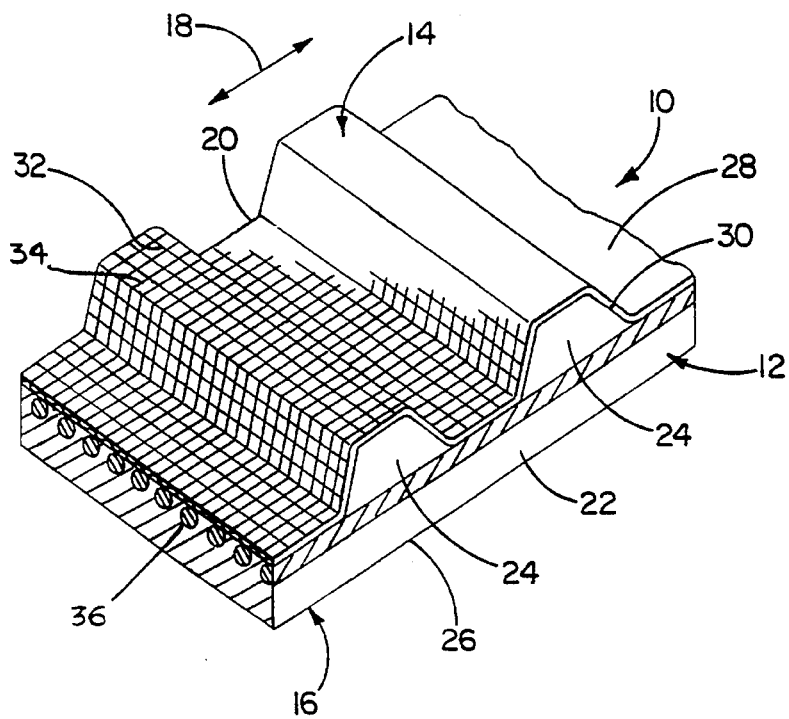
FIG. 1 is a fragmentary perspective view of a toothed power transmission belt according to the present invention.

In FIG. 1, a power transmission belt, according to the present invention, is shown at 10. The belt 10 has a body 12 with an inside 14, an outside 16, a length in the line of the double-headed arrow 18, and laterally spaced sides 20, 22. The body 12 defines a plurality of laterally extending teeth 24 spaced at regular intervals along the length of the body 12.

The body 12, including the teeth 24 and a back portion 26 of the body 12, are preferably made from rubber. Suitable rubbers are chloroprene rubber (CR), natural rubber (NR), millable urethane rubber, hydrogenated nitrile rubber (HNBR), chlorosulphonated polyethylene (CSM), and alkylated chlorosulphonated polyethylene (ACSM). The hydrogenation rate of the hydrogenated nitrile rubber is more than 80%, and preferably more than 90%, for the rubber to have the desired heat resistant and ozone resistant properties. If the hydrogenation rate for the hydrogenated nitrile rubber is less than 80%, the heat and ozone resistance for the rubber are significantly diminished.

Carbon black, zinc powder, stearic acid, plasticizer, aging inhibitor, and the like, can be added to the rubber as a blending agent. Sulfur or organic peroxide can be used as a vulcanizer. However, the use, and nature, of the blending agent and vulcanizer are optional.

A cloth layer 28 is adhered to the inside surface 30 of the body 12 over the teeth 24. A suitable material is a canvas cloth, made from 6-nylon, 6,6-nylon, polyester, aramid fiber, or the like, which various fibers may be used alone or in combination. Warp yarns 32, extending laterally of the belt 10, and weft yarns 34, extending lengthwise of the belt 10, cooperatively define the cloth layer 28 and are preferably filament or spun yarns made of the fibers, described above. The cloth layer 28 may be a plain weave, twill weave or satin weave. At least a portion of the weft is defined by shrinkable woolly nylon yarns, elastic urethane yarns, or mixed spun yarns with elastic urethane and nylon yarn.

In the case of a plain weave canvas, the warp and weft yarns 32, 34 alternate above and below at every crossover in both the lengthwise and a widthwise direction of the belt 10. However, with twill or satin weave canvas, the warp and weft yarns 32, 34 do not change relationship at every intersection, so that the number of raised crossing points is less than it would be with a corresponding plain weave canvas.

Rubber applied to the canvas layer 28 penetrates not only the space bounded by the yarns, but also the space between the yarns at the intersection between the warp and wept yarns 32, 34. The rubber thus maintains a space between the yarns 32, 34 at the crossover points and thereby lengthens the belt life.

In a preferred form, the cloth layer 28 is treated principally with a resorcin-formalin-latex (RFL) solution. The RFL solution includes an initial condensation product of resorcin and formalin mixed in a latex. The latex is preferably one of styrene-butadiene-vinylpyridine terpolymer, hydrogenated nitrile rubber, chlorosulphonated polyethylene, and epichlorhydrin.

Preferably, the cloth layer 28 is treated only with RFL solution, with a deposit of solid resorcin-formalin resin being adjusted to be 20 to 50% by weight. This makes the opening bounded by the warp and weft yarns 32, 34 smaller and less expandable so that the rubber defining the teeth 24 is not exposed as to rubber powder that might be worn off the belt in use. Further, the solid content of the resin on the surface of the teeth 24 reduces the friction thereat to decrease noise as the belt is operating.

Within the body 12, between the teeth 24 and the outside 16 of the body, a plurality of laterally spaced, longitudinally extending, load carrying cords 36 are embedded. In a preferred form, each cord 36 is an aramid fiber cord defined by gathering 100 to 400 monofilaments with a denier of 0.5 to 2.0 into groups to define strands, one or more of which are bundled to produce a combined diameter of 0.10 to 0.20 mm. The strand(s) is single twisted at no more than 100 times/10 cm. Alternatively, monofilaments can be gathered by a bonding treatment, without twisting.

If the monofilaments have a denier of less than 0.5, while the rigidity thereof is reduced, the modulus of elasticity is also decreased. With a belt of this type used on a printer carriage, printing accuracy may be compromised, with costs resultingly increased. If the denier exceeds 2.0, the belt flexibility is compromised and the belt become excessively rigid.

If the diameter of each load carrying cord 36 is less than 0.10 mm, the modulus of elasticity is decreased. Again, with the belt used on a printer carriage, this may account for an unacceptable compromise in printing accuracy. The PLD value (the distance between the pitch line passing through the center of the load carrying cords and the belt bottom land) of the belt may also decrease excessively, with the engaged length of the belt and pulley being increased.

On the other hand, if the diameter of each load carrying cord 36 exceeds 0.2 mm, the belt lacks the desired flexibility and may be highly rigid. This results in an increase in the required starting torque for the system.

The invention contemplates that the strands defined by the combined monofilaments could be bundled and primary-twisted, with a plurality of these strands gathered and finish-twisted into an aramid fiber rope of 0.10 mm to 0.20 mm. This construction, while contemplated, is not preferred, since the rigidity of a belt incorporating this type of load carrying cord 36 is increased over that using a single-twisted cord.

In the event that the monofilaments are not twisted, they can be gathered and held together through a bonding treatment. This bonding treatment uses a treating solution selected from one of RFL solution, epoxy compound, and isocyanate compound. Through this treatment, the filaments can be conveniently gathered and are less prone to fraying.

After this initial treatment, the load carrying cords 36 may be further treated with rubber cement. Alternatively, the RFL treatment can be eliminated and rubber cement used as the only treating agent. The bonding treatment with rubber cement may be repeated several times, if necessary.

The fibers used for the load carrying cords 36 preferably are aramid having aromatic nuclei in the main skeleton of the molecular structure. Suitable aramid fibers are available on the market and sold commercially under the trademarks "CONEX"™, "NOMEX"™, "KEVLAR"™, "TECHNORA"™ and "TWARON"™.

The belt, described above, can be made to remain soft and flexible under normal or low temperatures. Further, since the linear expansion coefficient of the aramid fibers is negative, tension at a low temperature, on the order of 5° to −35° C., is lowered, resulting in a reduced starting torque and decreasing the load imposed on the shaft. Accordingly, a small size motor can be utilized.

By treating the cloth layer 28 with the RFL solution, the openings in the cloth are made smaller and less expandable, to thereby prevent exposure of the rubber in the tooth portion and migration of small rubber particles through the openings to against the teeth. Further, the solid resin on the surface of the teeth reduces the friction at that surface to decrease noise during operation.

The effectiveness of the present invention is demonstrated by comparative testing between the inventive belts and other belt constructions not incorporating the present invention.

Invention Samples 1–3 and Comparative Sample 1

A twill weave canvas was woven with weft yarns made of 80 denier, 6-nylon and warp yarns made of 80 denier, 6-nylon with a warp density of 250 warp yarns/5 cm and a weft density of 300 weft yarns/5 cm. The fabric was placed in water and vibrated to shrink the width thereof to about ½ the original width. The canvas was immersed in an RFL solution and thereafter squeezed between a pair of rolls at 0.5 kgf/cm (gage pressure). The canvas was again immersed in the RFL solution and again squeezed at the same pressure and dried.

The solid deposit of resin on the teeth was about 20% based on the following formula: (canvas weight after treatment−canvas weight before treatment)/(canvas weight before treatment)×100(%).

A predetermined amount of aramid fiber filaments, sold under the trademark "TECHNORA"™, and with a predetermined diameter, were bundled into a strand. A single strand was finish-single-twisted 70 times/10 cm to prepare pairs of S- and Z-twisted cords, which were immersed in a cement made up of an RFL solution and dried to obtain a treated cord. The constitution of the cords is shown in Table 1, below.

lowered by 5 cm was measured. The starting torque was determined according to the following equation: starting torque=$(W-W_o) \times 0.65$, where $W_o$ represents the load at which the weight lowered by 5 cm with the belt not mounted.

To measure the relationship between the shaft load and the variation in the center distance, the belt was wrapped around driving and driven pulleys, each having 20 teeth. The driven pulley was movable in a lengthwise direction. The variation in the amount of center distance upon changing the shaft load by moving the driven pulley was measured.

Comparative Samples 2–3

Glass fiber filaments, each having a diameter of about 9 micrometers, were bundled to form a load caroling cord strand. The strand was immersed in RFL solution and dried at 250° C. for 2 minutes. A predetermined number of the strands were collected and twisted at 4.0 times/10 cm to

TABLE 1

|  | Inventive Sample | | | Comparative Sample | | |
| --- | --- | --- | --- | --- | --- | --- |
|  | 1 | 2 | 3 | 1 | 2 | 3 |
| Load Carrying Cord | | | | | | |
| 1. Material | Aramid fiber | Aramid fiber | Aramid fiber | Aramid fiber | Glass fiber | Glass fiber |
| 2. Monofilament | 0.5 d | 0.75 d | 1.5 d | 1.5 d | ECG150 | ECG150 |
| 3. Structure | 200 d/l | 200 d/l | 200 d/l | 400 d/l | 3/0 | 2/0 |
| 4. No. of finishing twist (no./10 cm) | 70 | 70 | 70 | 70 | 4 | 4 |
| 5. Rope dia. (mm) | 0.15 | 0.15 | 0.15 | 0.20 | 0.25 | 0.2 |
| 6. Belt rigidity (gf) | | | | | | |
| 25° C. | 0.7 | 0.9 | 1.0 | 1.4 | 1.5 | 1.5 |
| −5° C. | 1.0 | 1.2 | 1.5 | 2.0 | 2.9 | 2.6 |
| −35° C. | 1.5 | 1.8 | 2.1 | 2.9 | 6.4 | 5.2 |
| 7. Starting torque (g-cm) | | | | | | |
| 25° C. | 8.0 | 10.0 | 11.2 | 14.5 | 14.8 | 13.5 |
| 5° C. | 9.5 | 11.5 | 13.5 | 16.0 | 16.4 | 16.2 |

The cloth was formed into an endless cylinder which was placed on a metal mold. Pairs of S- and Z-twisted cords were alternatingly wound around the cloth on the mold at a pitch of 0.4 mm under a tension of 10 kg/load carrying cord. A sheet of chloroprene rubber was then wrapped over the cords and vulcanized using a conventional press fitting method.

The vulcanized belt sleeve was then cut to define individual belts. Each belt had 300 teeth, a tooth pitch of 2.032 mm, and a tooth shape that was a trapezoidal MXL tooth.

Figure 2:
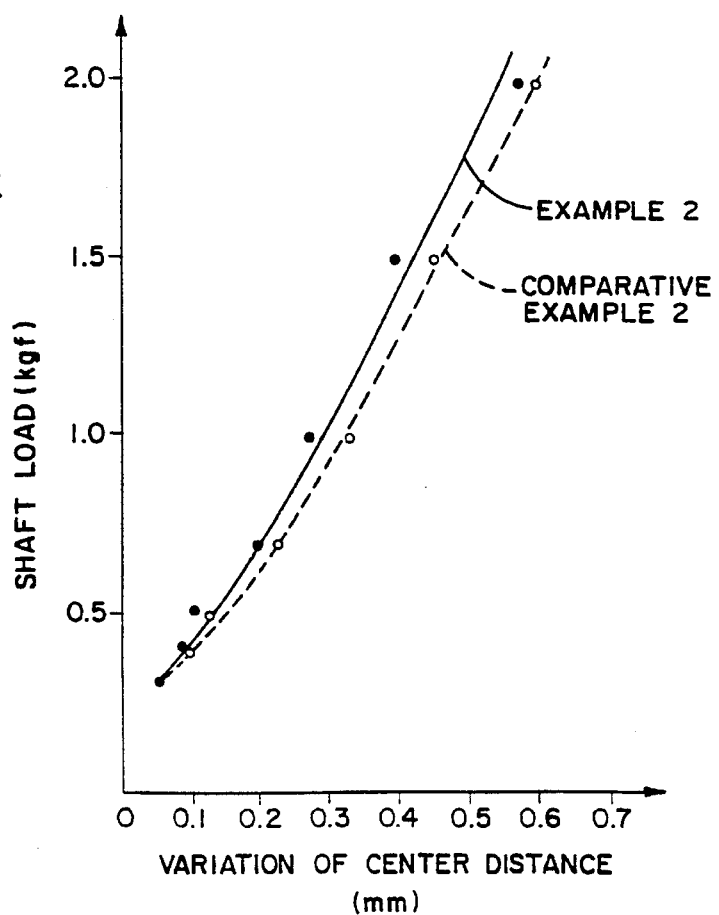
FIG. 2 is a graph illustrating the relationship between the shaft load and variation of center distance for a toothed belt according to the present invention and a conventional belt.

The rigidity, starting torque, and relationship between the shaft load and the variation in the center distance were measured for each of the belts at each of the temperatures identified in Table 1. The results of this testing are shown in Table 1 and FIG. 2.

To measure belt rigidity, a belt was placed on a table disposed in an oven and maintained at a predetermined temperature with ten teeth protruding from the end of the table. A load was applied on the protruding belt end. When the protruding portion of the belt flexed by 45°, the load was identified.

To measure the starting torque, the belt was wrapped around driving and driven pulleys, each having 20 teeth. 300 g of tension was applied with a shaft load on the driven pulley of 600 g. The minimum load (W) when the weight obtain the load carrying cord. The cords produced were 150-3/0 type, with a diameter of 0.25 mm, and ECG-150-2/0 type, with a 0.2 mm diameter. The belts were the same as the other samples except for the load carrying cords.

The rigidity and starting torque for each of the resultant belts at each of the temperatures was measured with the results being shown in Table 1.

The inventive belts remained flexible, even at low temperatures (i.e. at −35° C.). As a result, a smaller starting torque was necessary compared to the non-inventive belts. The flexibility of the inventive belt can also be seen from the relationship between the shaft load and the variation in the center distance in FIG. 2.

Accordingly, the inventive belt is soft and flexible at normal temperatures and at low temperatures. Tension at low temperature is lowered, thereby enabling application of a relatively small starting torque and decreasing the load imposed on the shafts, as compared to the non-inventive belts, thereby obviating the need for a large motor.

The foregoing disclosure of specific embodiments is intended to be illustrative of the broad concepts comprehended by the invention.

We claim:

1. A power transmission belt comprising:
   a body having an inside and an outside, a length, and a plurality of teeth on at least one of the inside and outside of the belt body and spaced in a lengthwise direction; and
   a load carrying cord embedded in the belt body and extending lengthwise of the belt body,
   wherein the load carrying cord comprises a first plurality of monofilament aramid fibers each having a denier of 0.5 to 2.0 and bundled to define a combined diameter of 0.10 to 0.20 mm.

2. The power transmission belt according to claim 1 wherein at least some of the monofilament aramid fibers in the first plurality of monofilament aramid fibers are twisted together.

3. The power transmission belt according to claim 2 wherein the at least some of the monofilament aramid fibers are single-twisted.

4. The power transmission belt according to claim 2 wherein the at least some of the monofilament aramid fibers are twisted up to 100 times/10 cm.

5. The power transmission belt according to claim 1 wherein at least some of the monofilament aramid fibers in the first plurality of monofilament aramid fibers are bonded together without twisting.

6. The power transmission belt according to claim 5 wherein the monofilament aramid fibers are bonded together using a treating solution that is at least one of a) an RFL solution, b) an epoxy compound, and c) an isocyanate compound.

7. The power transmission belt according to claim 5 wherein after the monofilament aramid fibers are bonded together, the monofilament aramid fibers are further treated with one of a) an RFL treatment, and b) rubber cement.

8. The power transmission belt according to claim 1 wherein at least some of the monofilament aramid fibers in the first plurality of monofilament aramid fibers comprise aramid fibers having aromatic nuclei in the main skeleton of the molecular structure.

9. The power transmission belt according to claim 1 wherein at least some of the monofilament aramid fibers in the first plurality of monofilament aramid fibers comprise aramid fibers sold commercially under at least one of the trademarks "CONEX"™, "NOMEX"™, "KEVLAR"™, "TECHNORA"™ and "TWARON"™.

10. The power transmission belt according to claim 1 wherein the teeth are covered on the at least one of the inside and outside of the belt body with a cloth layer.

11. The power transmission belt according to claim 10 wherein the cloth layer is treated with a resorcin-formalin-latex solution.

12. The power transmission belt according to claim 10 wherein the cloth layer comprises at least one of 6-nylon, 6,6-nylon, polyester, and aramid fiber.

13. The power transmission belt according to claim 10 wherein the cloth layer comprises warp and well yarns that are at least one of filament yarns and spun yarns.

14. The power transmission belt according to claim 10 wherein the cloth layer comprises warp and weft yarns and the weft yarns comprise at least one of woolly nylon yarns, elastic urethane yarns and a mixture of spun elastic urethane yarns and nylon yarns.

15. The power transmission belt according to claim 10 wherein the cloth layer comprises at least one of a plain weave, twill weave, and satin weave fabric.

16. The power transmission belt according to claim 1 wherein at least some of the monofilament aramid fibers in the first plurality of monofilament aramid fibers are grouped to define a first strand, at least some of the monofilament aramid fibers in the first plurality of monofilament aramid fibers are grouped to define a second strand and the first and second strands are twisted together.

17. A power transmission belt comprising:
    a body having an inside and an outside, a length, laterally spaced sides, and a plurality of teeth on the inside of the body and spaced in a lengthwise direction;
    a plurality of laterally spaced, load carrying cords embedded in the belt body and extending lengthwise of the belt body;
    a cloth layer on the inside of the belt body coveting the plurality of teeth; and
    a coating on the cloth layer,
    wherein the load carrying cords each comprise a first plurality of monofilament fibers each having a denier of 0.5 to 2.0 bundled to have a combined diameter of 0.10 to 0.20 mm.

18. The power transmission belt according to claim 17 wherein the monofilament fibers comprise aramid fibers having aromatic nuclei in the main skeleton of the molecular structure.

19. The power transmission belt according to claim 17 wherein the monofilament fibers comprise aramid fibers sold commercially under at least one of the trademarks "CONEX"™, "NOMEX"™, "KEVLAR"™, "TECHNORA"™ and "TWARON"™.

20. The power transmission belt according to claim 17 wherein the first plurality of monofilament fibers is single twisted up to 100 times/10 cm.

21. The power transmission belt according to claim 17 wherein a second plurality of the monofilament fibers is bonded together using a heating solution.

22. The power transmission belt according to claim 17 wherein the cloth layer is treated with a resorcin-formalin-latex solution.

* * * * *